FREDERICK L. HUNTER
INVENTOR

Patented Feb. 24, 1948

2,436,432

UNITED STATES PATENT OFFICE 2,436,432

METHOD FOR MAKING HYDROCHLORIC ACID

Frederick L. Hunter, Lake Bluff, Ill., assignor to Fansteel Metallurgical Corporation, North Chicago, Ill., a corporation of New York Application February 26, 1943, Serial No. 477,219

5 Claims. (Cl. 23—154)

1

This invention relates to a method for treating gases with liquids or for treating liquids with gases and to apparatus for practising the method. The treatment of gases with liquids or of liquids with gases is quite common, and the present invention may best be described by reference to its application to various common and well known examples of such treatments.

The present invention is based upon the discovery that exothermic reactions between gases and liquids may be carried out with great facility by passing the reacting substances downwardly in concurrent flow. Advantageously, the liquid is passed down a thermally conductive wall while the heat of reaction is removed by passing a suitable heat exchange medium up the opposite side of the wall.

Where the gas contains unreacting components, it is generally desired to remove the gas from contact with the liquid before all the reacting component has been consumed. The residual body of gas may then be passed in countercurrent manner through a scrubbing tower and the inert portion vented from the top of the tower. Advantageously, the scrubbing liquid may be the reacting liquid and the partially reacted liquid withdrawn from the scrubbing tower may be used as the initial material in the principal reaction.

According to a modification, also applicable where the gas contains an inert component, after removal of the gas from the contact zone, a small quantity of rich gas is passed countercurrent to the reacted liquid to render the reaction more complete. It is advantageous in such case to locate the two reaction zones so that the same gas discharge may be employed for both quantities of gas.

According to a further modification, the raw gas may be delivered to the reaction zone at spaced points along the down flowing film so that the reaction may take place more evenly.

This invention has been found especially adapted for the manufacture of hydrochloric acid from hydrogen chloride and water.

The solution of hydrochloric acid gas in water is one which is highly exothermic and the solubility of the gas is inversely proportional to the temperature. As an example of this, it is possible at a temperature of 0° C. to dissolve over 500 volumes of the gas in 1 volume of water, while at a temperature of 60° C. less than 350 volumes of gas can be dissolved in 1 volume of water and at a temperature of 110° C. only about 160 volumes may be retained by 1 volume of water.

2

The solution of hydrochloric acid gas in water is dependent upon the following conditions:

(a) The temperature of the gas and the liquid;

(b) The concentration of the gas in the gases to be scrubbed and the concentration of the acid liquid to be produced;

(c) The time of contact between the gas and the liquid, the average distance between the gaseous particles and the liquid particles, the thickness of the liquid layer and its movement internal and as a whole.

In the practice of the invention these factors are some of them more and some of them much less important than in the practice of prior art methods. In general, however, so far as has been observed, these are the principal factors involved and they are all important to some degree in determining the success of any system.

In the foregoing paragraphs and in the remainder of the specification, reference is made to the "solubility" of hydrochloric acid gas in water. It is the commonly accepted view that no chemical reaction takes place when the gas is contacted with water. Some observations lead to the belief that perhaps there is a reaction taking place, but because of the uncertainty which still exists it is simpler to adopt the conventionally held view without, however, express limitation in any way by either view.

Three general methods suggest themselves for bringing about intimate contact between gas and absorbing liquid:

(a) Spraying the liquid into the gas;

(b) Bubbling the gas through the liquid;

(c) Contact between liquid and gas by a distribution of the liquid over relatively large surfaces.

The first method mentioned above has not been found readily practical or efficient in the case of hydrochloric acid because of the high heat of solution and the difficulty that has been encountered in removing the heat generated. By this first method the production of acid of other than low strength has not been known. The second method, while in theory being satisfactory from the standpoint of producing acid of good strength and the successful removal of heat, also has proved to be impractical because of the highly corrosive nature of the gas to be handled and the high pressure encountered. Thus, there is left only the third method, or the direct exposure of the liquid to the gas for the satisfactory production of high strength hydrochloric acid. This method of direct exposure of the liquid to the gas and absorption through an interface lends itself especially to situations wherever the proportion of liquid in the body to the interface is kept small.

At the present time two general methods are used for bringing about this intimate contact between the soluble gas and the absorbing liquid. One of these methods employs glass, stoneware or fused silica vessels (tourills or S-bends) so designed that a relatively large surface of liquid is exposed to the gas. These vessels are also designed for cooling. The second method uses the vertical tower with a suitable packing material over which the absorbing liquid is passed, thus exposing extremely large surfaces of absorbing liquid to the gas. This latter method is used extensively where gas concentrations are low.

The tourill type of plant is satisfactory for the production of the higher strengths of acid, and the design of the apparatus is such as to allow satisfactory cooling and surface exposure of the absorbing liquid to the gases. There is, however, the objection that this plant requires a considerable floor space and necessitates many connections to maintain a circulation of both liquid and gas. Another difficulty commonly encountered in this type of plant is the necessity for maintaining a rather large volume of acid in order to balance the differences in concentration of acid produced from time to time. In most plants either the flow of gas or the percentage of hydrogen chloride in the gas is constantly fluctuating and on this account careful regulation is required. Automatic regulation has not been found readily applicable. It is an object of this invention to afford a method which is readily susceptible of automatic regulation.

According to the usual method of operation of this plant, the supply of water is introduced at the top of the unit, while the gas is introduced at or near the bottom flowing countercurrent to the water supply. Finished acid is withdrawn at the bottom. It has also been proposed to operate a plant of this type by introducing the gas near the top of the unit so that it flows in the same direction as the water. In such case also the acid is withdrawn at the bottom. In cold weather little cooling is attempted, since the plant is usually given free access to open air in order to provide adequate ventilation in the event of break-down. In warmer weather cooling is accomplished by allowing water to shower down over the apparatus.

The tower has been used extensively for the absorption of hydrochloric acid gas, particularly where the concentration of hydrogen chloride in the gas is not high, but from this it is difficult to produce acids of the higher strengths, as it is not practical to construct absorption towers with sufficient cooling to keep the tower temperature down to a point where high strength acid is produced. So far as is known, all tower plants operate in a countercurrent manner, that is, the water is supplied at the top and withdrawn as acid at the bottom and the gas is introduced near the bottom.

The new absorber possesses particular merit, in that it eliminates external cooling and recirculation, thereby making it possible to produce high strength acid continuously, provided cooling water of the necessary temperature is available.

The conditions which are favorable to continuous absorption of hydrochloric acid gas and rapidly increasing the strength of solution are as follows:

(a) Removal of the heat of reaction or solution at the instant it is generated and at the exact locality of its generation;

(b) Spreading out the liquid in a thin film so that the heat at the gas interface can be removed as rapidly as that from the solid interface;

(c) Intimate contact of the gas and the absorbing liquid;

(d) Cooling of the acid produced to a temperature below the boiling point for the particular concentration;

(e) Continuous and automatic regulation of the flow of water to the absorber chamber and of the cooling water to maintain constant conditions in the absorber which always respond to the rate of introduction of hydrogen chloride;

(f) A source of weak hydrochloric acid in quantity sufficient to provide all of the water required to take up the hydrogen chloride, the presence of a small amount of hydrogen chloride in solution in the "make" water greatly facilitating the absorption of additional hydrogen chloride;

(g) Removal of the cooled strong acid from further contact with raw gas as rapidly as it is produced.

It has been found that the metals tantalum, columbium and alloys of these two metals are uniquely suited for the construction of apparatus for the manufacture of hydrochloric acid. A number of these unusually desirable qualities will be set forth as the description proceeds. There is provided tantalum apparatus taking advantage of these unique properties, which apparatus enables the avoidance of many of the difficulties heretofore attendant upon the manufacture of strong hydrochloric acid.

In connection with the provision of said apparatus, it has been discovered that it functions most satisfactorily when operated contrary to many of the accepted practices known to the art, and to the end of taking best advantage of the properties of this new material of construction, there has been devised a new method of treating acid gases.

It is the more commonly accepted practice in the art to operate absorbers on the countercurrent flow principle, supplying the water or weak acid to the upper part of the apparatus and the gas to the lower part of the apparatus, withdrawing the finished acid at the base of the apparatus. When a high gas velocity is encountered, there is considerable disturbance of the liquid flow because of the tendency of the gas to blow the liquid off the cooling surface. When the weak acid and raw gas are flowed concurrently, it has been found that there is much less tendency for the film to be disturbed by high gas velocities.

In accordance with the present invention, the absorption is effected by passing the absorbing liquid downwardly on a thermally conductive wall concurrent with the hydrogen chloride containing gas. The heat of reaction is removed by passing a suitable heat exchange medium up the opposite side of the wall. In those instances where the gas contains unreactive constituents, it is generally desired to remove the gas from contact with the liquid before all of the hydrogen chloride has been absorbed. The residual gas may then be passed through a scrubbing tower countercurrent to the flow of water, and the liquid drawn from the scrubbing tower may be used advantageously as the initial absorbing liquid in the principal absorption or reaction. The inert constituents of the gas are vented from the top of the tower.

In accordance with a modification, also applicable where the hydrogen chloride gas contains inert constituents, after removal of the gas from the contact zone, a quantity of gas rich in hydrogen chloride is passed countercurrent through the reacted liquid to render the reaction more complete. It is advantageous in such case to locate the two reaction zones so that the same gas discharge may be employed for both quantities of gas.

According to a further modification, the raw hydrogen chloride containing gas may be delivered to the reaction zone at spaced points along the down flowing film of absorbing liquid so that the reaction may take place more evenly.

This invention can be more fully appreciated and illustrated by reference to the accompanying drawings, wherein there is illustrated diagrammatically apparatus which forms two embodiments of the invention.

Figures 1, 2:
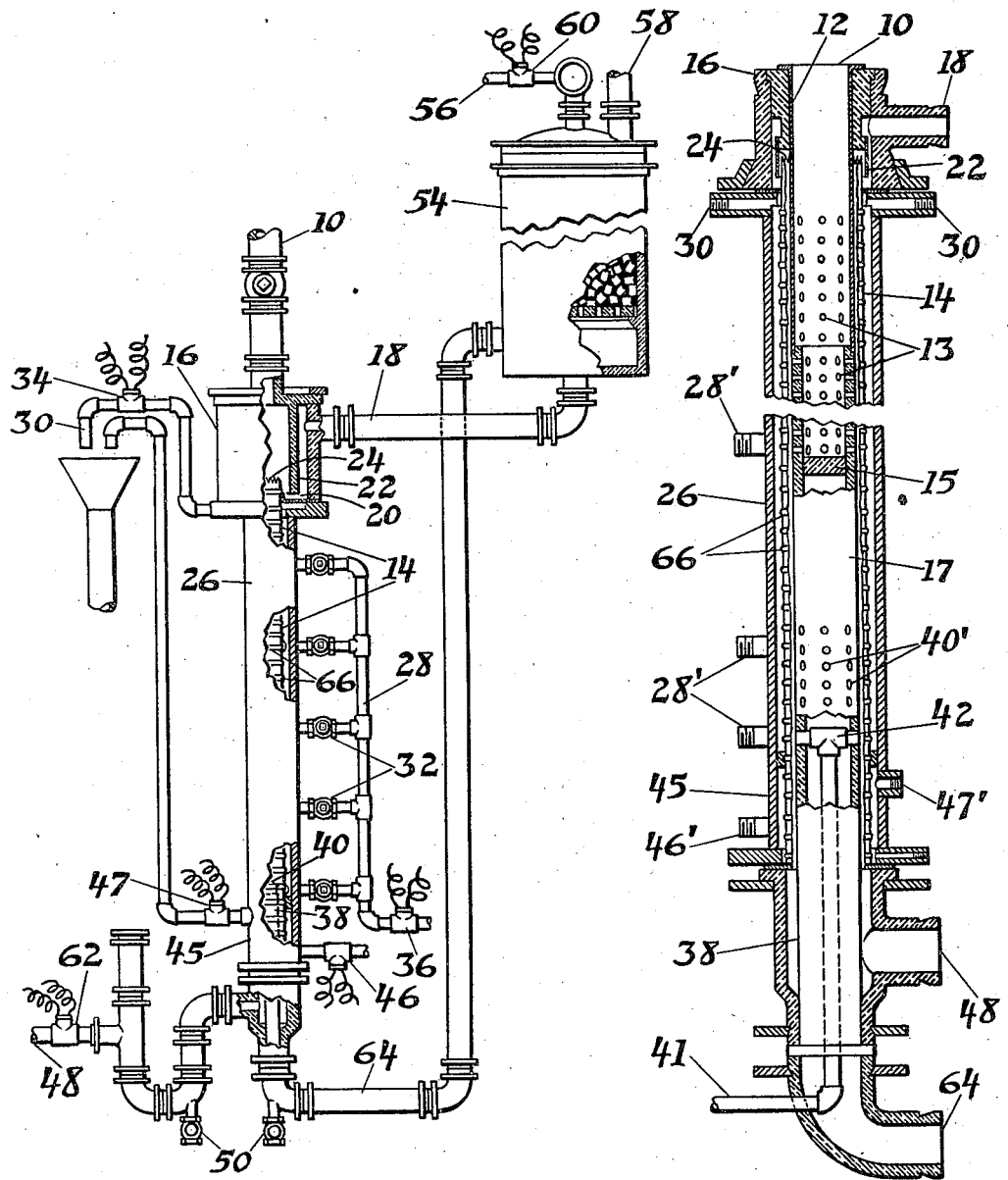
Fig. 1 is a partially schematic, partially sectional elevation of one embodiment of the apparatus of this invention.
Fig. 2 is a partially schematic, partially sectional elevation of another embodiment of the apparatus of this invention.

Referring to Fig. 1, hydrogen chloride entering through inlet 10 passes through upper bonnet 16 down the absorber column wall 14. The wall 14 is in the form of a generally vertical tube and is advantageously formed from relatively thin tantalum, columbium or alloys predominating in one or both metals. Weak hydrochloric acid is delivered to the upper bonnet by way of inlet 18, collecting in pool 20. Thence it passes under gas trap and water baffle 22 and over the notched liquid distributor ring 24 at the top of column 14. The arrangement of these parts is such as to promote quiescence of the pool and to provide for the formation of a plurality of streams down the side wall of column 14. Serrations of V-shape have the additional advantage of accommodating a considerable variation in the volume of flow with desired flexibility of operation. Cooling water is supplied to the jacket 26 by inlet lines and manifold 28 and controlled directly by cooling water distributing valves 32. The water escapes to the drain at 30.

Temperatures from a moderate high of about 180° F. down to 40° F. and below are favorable to the initial steps of the absorption of hydrogen chloride in the weak acid, but as the concentration increases the temperature must be reduced to keep the solution from boiling and decomposing. The flow of cooling water, therefore, is preferably regulated by the final temperature of the cooling water as it emerges from the jacket. This regulation is effected by thermo-regulator 34 which controls the action of valve 36 in line 28. An increase in the amount of hydrogen chloride introduced results in an increase in the outlet temperature of the cooling water. The thermoregulator 34 and valve 36 are so connected that an increase in the outlet temperature causes valve 36 to be opened, thereby increasing the flow of water. The object of valves 32 is to distribute the admission of cooling water to the jacket so that zones of rapid absorption, which tend to vary somewhat with the amount of inert gas present in the intake gas, may be maintained at a suitably low temperature. In general it has been found that it is desirable to introduce most of the water through the lowest of these valves.

The lower part of the column is provided with an independent cooling jacket 45 to reduce the temperature of the finished acid from the final temperature in the absorbing section or column, which final temperature is dependent upon the optimum temperatures of absorption for the character for gas employed. The inlet to the jacket is provided with an automatic valve 46 which is controlled by thermo-regulator 47 in the outlet line in order to maintain the outgoing acid at the appropriate and desired temperature. The cooled acid is then withdrawn to storage or for use at 48. It has been found desirable where there are appreciable quantities of inert diluent gas to halt the absorption operation while there is yet hydrogen chloride available. Since the distribution of hydrogen chloride between gas and liquid tends to reach an equilibrium near the end of the travel of the gas down the column, it is obvious that to remove all of the hydrogen chloride from the gas in a reasonable-sized apparatus it would be necessary to maintain the finished acid at a relatively low concentration. Furthermore, in order to cool the finished acid and maintain it cool, it is desirable to maintain it out of contact with hot hydrogen chloride gas or vapor which tends to heat up the acid. Accordingly, at about the point where the acid passes from the absorption chamber to the temperature conditioning chamber, the unabsorbed gas passes through vent 40 in the gas separator tube 38 which is located concentrically within the temperature conditioning chamber.

The gas passes through tube 38 and tailing gas line 64 to gas scrubbing tower 54. Here the gases meet the down-flowing "make" water supply from 56 which scrubs out the last traces of hydrogen chloride to form weak hydrochloric acid, the absorbing medium. The unabsorbed gases are removed by way of line 58 in any suitable manner. The flow of "make" water may be regulated by valve 60 which is responsive to the specific gravity controller 62 in the finished acid line 48. As the specific gravity of the finished acid varies from the concentration which has been predetermined, more or less "make" water is admitted to the tower 54 to bring the concentration back in line with the predetermined value. Line 64 also has the function of accommodating any instantaneous surge in the absorber proper, enabling the absorber to be designed for continuous operation at a sustained level without unnecessary capacity which would be required only in the event of an occasional surge.

The grooves or beads 66 rolled into the thin tantalum wall 14 of the absorber column tend to assist in promoting even distribution over the entire wall area, as well as providing additional rigidity for supporting the wall. Even distribution may be further improved by thoroughly cleaning the surface of the tantalum, particular care being exercised to remove grease and oil films. Valves 50 are provided to drain the apparatus when not in use.

Several modifications which have been found desirable in certain instances are shown in Fig. 2. According to this modification, the gas enters the gas distributor tube 12 located within and concentric to the absorption tube 14. The hydrogen chloride passes through the distributor tube 12 by means of a series of holes 13 and is thereby permitted to come in contact with a falling film of liquid on the inner surface of the absorption tube 14. By modifying the size and area of the holes 13 it is possible to selectively control the rate of absorption along the wall of the tube 14, as is desired. It is preferred to construct the distributor tube in two or more sections, the upper section 12 being made of thin tantalum which, because of its great strength, occupies comparatively little space. As the gas passes out through the upper holes in the distributor tube and is reduced in volume, it is satisfactory to increase the space occupied by the distributor tube by using a less expensive non-metallic material for the lower portion thereof. After the gas has passed down a fair portion of the column, a separator plug 15 is inserted in the distributor tube in order to force all of the gas out into intimate contact with the falling film of liquid. The gas and water then pass through an equilibrium section 17 of the absorption tube, in which section the gas and liquid tend to reach equilibrium conditions. In the construction shown in Fig. 2 holes 40' provided in the lower section of the distributor 12 permit the unabsorbed gas to pass out through tube 38 into the tailing as line 64.

Another modification shown in Fig. 2 may be employed to increase the concentration of the acid when the concentration of hydrogen chloride in the gas supplied at 10 is low. A relatively small amount of gas rich in hydrogen chloride is supplied to the line 41. Line 41 by branches 42 supplies this gas to a number of inlets in tube 38 to a low point in the absorption tube below tailing gas outlets 40'. The high concentration of hydrogen chloride in the gas at this point tends to throw the equilibrium over so that the acid produced is of considerably greater concentration. The unabsorbed portion of the rich gas travels upward along the liquid film and out through the tailing gas vents 40'. This slightly increases the proportion of hydrogen chloride in the tailing gas, but since the amount of rich gas supplied to line 41 is relatively small, not exceeding 30% of the total gas supplied, the amount of hydrogen chloride in the tailing gas will not exceed that portion which is necessary to supply weak acid to inlet 18. In Fig. 2 the cooling medium inlets, corresponding to those of Fig. 1 supplied by the manifold 28, are indicated by the numeral 28' and the conduits, corresponding to those shown in Fig. 1 as provided with valves 46 and 47, are designated in Fig. 2 by the numerals 46' and 47' respectively.

When the system is producing acid of a concentration lower than 20.5 Bé., the tower can be permitted to boil without fear of losing an excess of hydrochloric acid vapor through the vent, the reason being that the concentration of the tower acid is below that of a constant-boiling mixture. At temperatures up to 105° C. water is evolved upon boiling instead of acid. Attempts to produce stronger acid under the same conditions will result in the loss of acid through the exhaust gas.

Tantalum is peculiarly suitable as a material of construction in acid-manufacturing apparatus. Its resistance to corrosive agents, particularly hydrochloric acid, at relatively low temperatures is so great that it may be said to have substantially infinite life. Contrasted with ceramic materials, such as glass or fused silica, it has the high heat transfer qualities characteristic of the metals. Heat transfer rates involving liquid hydrochloric acid on one side of the metal range from 800 to 1,600 B. t. u. per sq. ft. per degree F. per hour, values twice as great as that being not uncommon. Throughout its useful life it maintains these values without loss due to oxidation or film-formation. Compared with other metals, tantalum, besides being practically non-corrodible, is one of the stronger pure metals, having approximately the same mechanical properties as mild steel. Columbium and tantalum-columbium alloys also possess these same desirable properties and it is, therefore, to be understood that wherever the use of tantalum is suggested it is meant to imply that these equivalent metals may be substituted.

As examples of the results which may be achieved by the practice of the invention when employed in the manufacture of hydrochloric acid, the following conditions are typical:

Hot gases containing about 90% hydrochloric acid are supplied to the absorber at a temperature of from 90° to 120° F., the gases being supplied at the rate of from about 200 pounds to about 350 pounds per hour to a column 4 inches in diameter and 6 feet long. Cooling water enters at about 75° F. and may be removed at a temperature not less than 140° F. Very satisfactory results are obtained by operating the outlet between 165° and 170° F. The finished acid, depending upon the requirements, is withdrawn at concentrations of 12° to 24° Bé. The supply of "make" water is varied according to the strength of acid required.

Where it is desired to produce very strong acid in the apparatus described in the previous example, the cooling water is used as cold as may be obtained, or, if it is available, cold brine is used at temperatures of about 20° to 40° F. The cooling liquid outlet temperature is maintained as low as is economical. The concentration of the finished acid is relatively high, only a few percent below the equilibrium percentage corresponding to the cooling liquid temperature. If the column is operated below atmospheric temperature, it will be necessary to store the acid under super-atmospheric pressure to prevent decomposition.

This type of operation may be employed to increase the capacity of the column to take care of temporary increase in the supply of gas or demand for finished acid. The tantalum wall is capable of transmitting such a relatively large amount of heat that it is necessary only to conduct it away in order to accommodate an increased flow of gas. The finished acid may be diluted with water in order to avoid the necessity for storage under elevated pressure.

When the invention is operated according to the foregoing disclosure, such modification being permissible as would be obvious to one skilled in the art, several important advantages will result therefrom. One of the major advantages which proceeds from the use of the method and apparatus of my invention is the substantial reduction in the size of the equipment necessary to handle a given through-put of hydrochloric acid gas.

A further advantage is the freedom from operating shutdowns, which results from the use of a lighter and less fragile material of construction. Even if the saving in the cost of replacing ceramic material were wholly neglected, the use of the new absorber would still be justified for the reason that costly and annoying shut-downs, due to breakage of ceramic equipment, are done away with.

Another prime advantage is the flexibility of operation coupled with ease of control, which enables the production of finished acid direct from the apparatus having such a constant quality that it may be marketed without further treatment.

The method and apparatus, as described hereinbefore, may also be employed in carrying out other reactions between liquids and gases.

Sulfurous acid may be manufactured in a manner similar to that described for the manufacture of hydrochloric acid. Water or dilute sulfurous acid may be employed as the absorbing liquid, which is passed downwardly on a thermally conductive wall. Sulfur dioxide or gas containing sulfur dioxide is passed concurrent with the water. The heat of reaction is removed by passing a suitable heat exchange medium up the opposite side of the wall. The method and apparatus employed in this reaction may be identical to the one described for the manufacture of hydrochloric acid.

In a similar manner it is possible to react carbon dioxide with water to form carbonic acid.

Ammonium hydroxide may be prepared in a like manner by passing water and gaseous ammonia in concurrent flow.

It is obvious that in the manufacture of these and other materials, in accordance with the present invention, the optimum temperatures along the thermally conductive wall may vary from those employed in the manufacture of hydrochloric acid. The various temperatures will be dependent upon the product being manufactured.

The present method is also satisfactory for the preparation of aqueous solution of salts. An aqueous or other solution containing one of the reactants is passed down the thermally conductive wall concurrent with a gas containing a reactant, in the same manner as described in the preparation of the acids. The present invention, for example is satisfactory for the preparation of ammonium chloride. Hydrochloric acid solution is passed down the wall in concurrent flow with gaseous ammonia. As an alternative, an ammonium hydroxide solution may be passed downwardly on the wall and hydrogen chloride passed concurrent with the ammonium hydroxide solution.

Other salts may be prepared in a similar manner. For example, an alkaline solution, such as ammonium, calcium, sodium or potassium hydroxide solutions, may be passed downwardly on the wall and carbon dioxide, hydrogen chloride or sulfur dioxide gas, or a gas containing carbon dioxide, hydrogen chloride or sulfur dioxide may be passed in concurrent flow with the alkaline solution. In such methods the optimum temperatures will also vary from those specifically set forth illustrating the manufacture of hydrochloric acid, and the particular temperatures will be governed by the reactants and other conditions of the reaction.

The present method is also satisfactory in effecting various reactions involving the use of organic materials. The simplest of such reactions, illustrative of the invention as applied to the field of organic chemistry, is the halogenation of aliphatic hydrocarbons. The hydrocarbon in liquid state is passed downwardly on the thermally conductive wall. The gaseous reactant is passed concurrent with the hydrocarbon. In certain instances it may be necessary to supply heat so that the particular hydrocarbon enters the apparatus in a liquid state.

Various hydrocarbon materials may be treated in accordance with this invention, and it has been found that hydrocarbons of petroleum orig'n, which are liquid at ordinary temperatures, may be continuously halogenated in accordance with the present invention. Specific applications of the present invention to hydrocarbons of petroleum origin include the halogenation of kerosene, gasoline and naphtha in apparatus such as described herein. The liquid is passed down the thermally conductive wall and the halogenating agent is passed concurrent with the liquid. Gaseous chlorine, bromine or hydrogen bromide may be employed in this halogenation process.

This invention is not limited to the treatment of liquid hydrocarbons, but it may also be employed in reacting gaseous hydrocarbons with liquid reactants. The gaseous hydrocarbon may be a hydrocarbon which exists as a gas at ordinary temperatures such as ethane or propane, or it may be a relatively low boiling hydrocarbon which exists in a liquid state at ordinary temperatures such as pentane or hexane. Such gaseous hydrocarbons or vaporized hydrocarbons may be reacted with various reactants, such as fuming sulfuric acid or chlorosulfonic acid. The liquid reactant is passed downwardly on the thermally conductive wall and the gaseous reactant is passed concurrent with the liquid.

The invention may also be employed for other reactions involving organic materials. The reaction between alcohols and gaseous hydrogen chloride, hydrogen bromide and hydrogen fluoride is also readily effected by the use of the present invention. Any of the alcohols which react with the gaseous agents are satisfactory, such as the primary aliphatic alcohols, for example, methyl, ethyl, butyl, iso-butyl alcohols and the like. In a similar manner ketones, for example, di-methyl ketone, methyl ethyl ketone, di-ethyl ketone, methyl propyl ketone and the like, may be reacted with the gaseous agents. It is to be understood that other alcohols and ketones may be treated in accordance with this invention and that the foregoing specific compounds are set forth merely by way of example.

In those instances where the liquid reactant or the product of the reaction is volatilized at the temperature of reaction or due to the heat of reaction, the method may be practised by reacting the materials and maintaining the product under suitable pressure.

Although the apparatus has been described and illustrated to show the use of tantalum, columbium or alloys predominating in tantalum, columbium or both, as constituting the thermally conductive wall, it will be apparent that other materials of construction may be employed where such other material withstands the corrosive action of the particular reactants and of the products of the reaction. The thermally conductive wall should be as thin as practical so that there may be a rapid transfer of heat between the liquids on opposite sides of the wall.

This application is a continuation in part of my copending application, Serial No. 235,354, filed October 17, 1938, now abandoned, entitled Method and apparatus for treating gases, which application is a continuation in part of my prior application, Serial No. 174,603, filed November 15, 1937, now abandoned, entitled Method and apparatus for treating gases. For so much of the subject matter herein disclosed, which is also disclosed in either of my said applications, I claim priority of said applications.

It is to be understood that this invention is not limited to the preferred embodiments of the method and apparatus or to the specific details set forth herein. The foregoing description is intended merely to illustrate the invention, and various modifications will suggest themselves to those skilled in the art and may be made without departing from the spirit and scope of my invention. For example, it is obvious that this method and apparatus is applicable to reactions which require external heat to maintain the reacted material in liquid state. The heat of reaction may be insufficient to insure temperatures at which the reaction products exist in a liquid state, and in such instances a heating liquid or medium may be substituted for the usual cooling liquid.

I claim:

1. In the art of producing hydrochloric acid from hydrogen chloride and water, the improvement which includes the steps of passing a minor proportion of hydrogen chloride in countercurrent contact flow with water to produce dilute hydrochloric acid, passing the major proportion of hydrogen chloride in concurrent contact flow with said dilute acid while cooling with countercurrent out-of-contact flow of heat exchange medium and collecting a strong hydrochloric acid at a point remote from the point of initial concurrent contact.

2. In the art of producing hydrochloric acid from hydrogen chloride and water, the improvement which includes the steps of passing hydrogen chloride and connate gases in concurrent contact flow with dilute hydrochloric acid, cooling with countercurrent out-of-contact flow of cooling water, collecting a strong hydrochloric acid at a point remote from the point of initial concurrent contact, collecting the connate gases with minor amounts of entrained hydrogen chloride, passing the collected gases in countercurrent contact with water to scrub the hydrogen chloride from the connate gases thereby producing dilute hydrochloric acid, removing the scrubbed gases and utilizing the dilute hydrochloric acid in the concurrent absorption.

3. In the art of producing hydrochloric acid from hydrogen chloride, the improvement which includes the steps of flowing a thin film of dilute hydrochloric acid down a generally vertical tube of relatively thin-walled tantalum, passing a gas consisting principally of hydrogen chloride down the tube in intimate contact with said film, passing a stream of cooling water up and around said tube to maintain the temperature of said film below 180° F. and above 140° F. at the top of said tube and below the decomposing point of the concentration of hydrochloric acid prevailing at each point on said tube, collecting and removing the hydrochloric acid produced, collecting the unabsorbed gases, scrubbing the same by passing them upwardly against a downwardly flowing stream of water and utilizing the dilute hydrochloric acid thus formed to provide an absorption medium in the principal absorption operation.

4. In the art of conducting an exothermic reaction between a gas and a liquid wherein the gas is admixed with non-reacting gas, the improvement of passing the gas and liquid in extended concurrent flow while removing heat of reaction by out-of-contact heat exchange, removing the gaseous admixture of reacting and non-reacting gas from the locus of reaction before completion of the reaction, passing a smaller quantity of gas relatively richer in the reacting component in countercurrent relation to the flow of reacting liquid and continuing the cooling of the liquid beyond the point of initial contact between the liquid and the rich gas.

5. In the art of producing hydrochloric acid from water and gas which contains hydrogen chloride, the improvement which includes the steps of flowing a thin film of relatively dilute hydrochloric acid down a generally vertical, thermally conductive tube, passing the gas containing hydrogen chloride down the tube in intimate contact with said film, passing a stream of cooling fluid up and around said tube to maintain the temperature of said film below the decomposing temperature of the concentration of hydrochloric acid prevailing at each point on said tube, collecting and removing the hydrochloric acid at the bottom of said tube, passing the gas unabsorbed in concurrent flow in countercurrent flow with water to form dilute hydrochloric acid and utilizing the dilute hydrochloric acid as the absorption acid in the concurrent absorption.

FREDERICK L. HUNTER.

REFERENCES CITED

The following references are of record in the file of this patent:

UNITED STATES PATENTS

| Number | Name | Date |
|---|---|---|
| 2,221,787 | Downs | Nov. 19, 1940 |
| 1,969,381 | Mullen | Aug. 7, 1934 |
| 1,563,732 | Egleson | Dec. 1, 1925 |
| 1,141,266 | Raschig | June 1, 1915 |
| 1,654,181 | Mann | Dec. 27, 1927 |
| 1,398,224 | Frederikson | Nov. 29, 1921 |

OTHER REFERENCES

Lunge, "Sulphuric Acid and Alkali," vol. 2, part 1, page 37. Pub. by Sweeney & Jackson, London (1909).

Cumming, "Hydrochloric Acid and Salt Cake," page 241. Published by D. Van Nostrand Co., New York (1923).

Mellor, "Inorganic and Theoretical Chemistry," vol. 9, pages 849, 891. Pub. by Longmans, Green and Co., London (1929).